United States Patent
Chretien et al.

(10) Patent No.: US 12,140,345 B2
(45) Date of Patent: *Nov. 12, 2024

(54) MULTI-CAPACITY COMPRESSOR WITH VARIABLE SPEED DRIVE AND METHOD OF USE

(71) Applicant: Regal Beloit America, Inc., Beloit, WI (US)

(72) Inventors: Ludovic Andre Chretien, Columbia City, IN (US); Norman C. Golm, Jr., Fort Wayne, IN (US)

(73) Assignee: Regal Beloit America, Inc., Beloit, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/272,085

(22) Filed: Feb. 11, 2019

(65) Prior Publication Data
US 2019/0170404 A1   Jun. 6, 2019

Related U.S. Application Data

(63) Continuation-in-part of application No. 15/334,101, filed on Oct. 25, 2016, now Pat. No. 10,203,141.

(51) Int. Cl.
*F25B 49/02*   (2006.01)
*F04D 27/00*   (2006.01)
(Continued)

(52) U.S. Cl.
CPC .............. *F25B 1/10* (2013.01); *F04D 27/004* (2013.01); *F25B 27/00* (2013.01); *F25B 49/022* (2013.01);
(Continued)

(58) Field of Classification Search
CPC .... F04D 27/004; F25B 49/025; F25B 49/022; F25B 1/10; F25B 27/00;
(Continued)

(56) References Cited

U.S. PATENT DOCUMENTS 4,566,289 A   1/1986 Iizuka
4,787,211 A   11/1988 Shaw
(Continued)

FOREIGN PATENT DOCUMENTS

JP   2005180748 A  *  7/2005
KR   20060098080 A  *  9/2006

OTHER PUBLICATIONS

Ohara et al., Refrigeration Air Conditioner, Jul. 7, 2005, JP2005180748A, Whole Document (Year: 2005).*
(Continued)

*Primary Examiner* — Jerry-Daryl Fletcher
*Assistant Examiner* — Larry L Furdge
(74) *Attorney, Agent, or Firm* — Armstrong Teasdale LLP

(57) ABSTRACT

An HVAC system including a multi-capacity compressor, and a control system for the multi-capacity compressor are described herein. The control system includes an AC line voltage source, a variable-voltage variable-frequency drive, and a processor. The AC line voltage source is configured to operate the multi-capacity compressor. The variable-voltage variable-frequency drive is coupled to the AC line voltage source and is configured to operate the multi-capacity compressor at a variable speed. The processor is coupled to the AC line voltage source and the variable-voltage variable-frequency drive, and is configured to selectively couple the AC line voltage source and the variable-voltage variable-frequency drive to the multi-capacity compressor to operate the multi-capacity compressor. The processor is further configured to transmit a capacity control signal to the multi-capacity compressor. The capacity control signal is instructive to operate the multi-capacity compressor in one of a plurality of capacity settings.

22 Claims, 4 Drawing Sheets

(51) Int. Cl.
  *F25B 1/10* (2006.01)
  *F25B 27/00* (2006.01)
(52) U.S. Cl.
  CPC .... *F25B 49/025* (2013.01); *F25B 2600/0253* (2013.01); *F25B 2600/111* (2013.01); *F25B 2700/2104* (2013.01); *F25B 2700/2106* (2013.01)
(58) Field of Classification Search
  CPC ...... F25B 2700/2104; F25B 2700/2106; F25B 2600/0253; F25B 2600/11
  See application file for complete search history.

(56) References Cited

U.S. PATENT DOCUMENTS

| | | | |
|---|---|---|---|
| 4,876,859 A | 10/1989 | Kitamoto | |
| 4,947,655 A | 8/1990 | Shaw | |
| 4,988,930 A | 1/1991 | Oberheide | |
| 5,218,283 A * | 6/1993 | Wills | H02P 25/04 318/123 |
| 5,570,585 A | 11/1996 | Vaynberg | |
| 5,828,200 A * | 10/1998 | Ligman | H02P 23/0004 318/729 |
| 5,915,070 A * | 6/1999 | Takekawa | H02P 23/0077 388/811 |
| 6,246,207 B1 | 6/2001 | VanSistine et al. | |
| 6,508,072 B1 * | 1/2003 | Kanazawa | F24F 11/89 236/78 D |
| 7,760,497 B2 | 7/2010 | Eddy | |
| 8,981,705 B2 | 3/2015 | Ramu | |
| 9,631,852 B2 | 4/2017 | Kopko | |
| 9,803,803 B1 | 10/2017 | Adams | |
| 10,203,141 B1 * | 2/2019 | Chretien | F04D 27/004 |
| 2002/0038554 A1 * | 4/2002 | Monk | F04B 39/0094 62/228.5 |
| 2002/0110461 A1 | 8/2002 | Iwanami | |
| 2002/0134094 A1 | 9/2002 | Huh | |
| 2003/0051494 A1 | 3/2003 | Ohya | |
| 2003/0169013 A1 | 9/2003 | Kadah | |
| 2003/0206804 A1 * | 11/2003 | Smith | H02P 27/00 417/44.1 |
| 2004/0093893 A1 * | 5/2004 | Tanimoto | F25B 49/025 62/510 |
| 2004/0159115 A1 * | 8/2004 | Matsunaga | F25B 49/025 62/228.1 |
| 2004/0163613 A1 * | 8/2004 | Bystedt | F04B 39/066 123/41.31 |
| 2006/0032255 A1 | 2/2006 | Wang | |
| 2006/0061321 A1 | 3/2006 | Han et al. | |
| 2006/0097687 A1 | 5/2006 | Byrnes, Jr. et al. | |
| 2008/0188173 A1 | 8/2008 | Chen | |
| 2008/0209925 A1 | 9/2008 | Pham | |
| 2008/0314057 A1 * | 12/2008 | Lifson | F25B 1/10 62/228.4 |
| 2009/0030554 A1 * | 1/2009 | Bean, Jr. | H05K 7/20836 700/276 |
| 2009/0196764 A1 | 8/2009 | Fogarty | |
| 2010/0058781 A1 * | 3/2010 | Lifson | F25B 1/10 62/79 |
| 2010/0064703 A1 | 3/2010 | Senf, Jr. | |
| 2010/0085000 A1 | 4/2010 | Todd | |
| 2010/0307191 A1 * | 12/2010 | Sommer | F25B 31/006 62/505 |
| 2011/0144811 A1 | 6/2011 | Liu | |
| 2011/0234134 A1 | 9/2011 | Ramu | |
| 2012/0090337 A1 * | 4/2012 | Chen | F25B 30/02 62/79 |
| 2019/0170404 A1 | 6/2019 | Chretien et al. | |

OTHER PUBLICATIONS

Lee, Compressor Operating Control Method of Inverter Air Conditioner, Sep. 18, 2006, KR20060098080A, Whole Document (Year: 2006).*

International Search Report and Written Opinion, dated Jun. 18, 2020, for International application No. PCT/US2020/017513 (20 pgs.).

* cited by examiner

MULTI-CAPACITY COMPRESSOR WITH VARIABLE SPEED DRIVE AND METHOD OF USE

CROSS-REFERENCE TO RELATED APPLICATIONS

This application is continuation-in-part application of U.S. patent application Ser. No. 15/334,101, filed Oct. 25, 2016, entitled "MULTI-STAGE COMPRESSOR WITH VARIABLE SPEED DRIVE AND METHOD OF USE", the entire contents and disclosure of which are hereby incorporated by reference herein.

BACKGROUND

The field of the disclosure relates generally to multi-capacity compressors, and more specifically to a multi-capacity compressor with a variable speed drive.

Known multi-capacity compressors provide two or more levels of compression, e.g., a two-capacity compressor provides a high and low compression level. Many known heating ventilation and cooling (HVAC) systems, such as, for example, an air conditioner or a heat pump, utilize multi-capacity compressors to provide two levels of cooling capacity. One level, i.e., the high-capacity setting, provides cooling for hot, high-demand days. Another level, i.e., the low-capacity setting, provides cooling, for example, for milder days or other low-cooling demand periods of time. A typical installation utilizes the low-capacity setting 80% of the time, resulting in improved efficiency in operating the HVAC system. In such systems, the two-capacity compressor operates for longer periods of time, produces less noise, and produces more even temperatures. Accordingly, multi-capacity HVAC systems provide greater comfort and operate with greater efficiency.

A typical two-capacity HVAC system operates at 100% capacity on the high-capacity setting and at about 66% capacity on the low-capacity setting. Such systems demonstrate an improved, i.e., higher, seasonal energy efficiency ratio (SEER) when operating at lower capacity. Efficiency improvements are gained in part by more efficient operation of the compressor, and also through operation of the indoor and outdoor fans at lower speeds. Typically, the system is more efficient at lower compressor capacity. Efficiency improvements are typically limited in this regard, in that the two-capacity compressor cannot operate at a low enough capacity to match the cooling load or achieve the efficiencies of fully variable speed systems.

BRIEF DESCRIPTION

In one aspect, a heating ventilation and air conditioning (HVAC) system is provided. The HVAC system includes a multi-capacity compressor configured to operate selectively at a high-capacity setting, a medium-capacity setting, and a low-capacity setting to provide a compressor output. The HVAC system also includes a variable-voltage variable-frequency drive coupled to the multi-capacity compressor and configured to operate the multi-capacity compressor at a variable speed, and a processor coupled to the multi-capacity compressor and the variable-voltage variable-frequency drive. The processor is configured to select one of the high-capacity setting, the medium-capacity setting, or the low capacity setting at which the multi-capacity compressor should operate based on a load determined for the multi-capacity compressor. The processor is also configured to employ the variable-voltage variable-frequency drive to operate the multi-capacity compressor at the variable speed to match the compressor output to the load, and bypass the variable-voltage variable-frequency drive when operating the multi-capacity compressor at the high-capacity setting for a compressor heating output based on a heating load.

In another aspect, a control system for a multi-capacity compressor is provided. The control system includes an alternating current (AC) line voltage source configured to operate the multi-capacity compressor, a variable-voltage variable-frequency drive coupled to the AC line voltage source and configured to operate the multi-capacity compressor at a variable speed, and a processor coupled to the AC line voltage source and the variable-voltage variable-frequency drive. The processor is configured to selectively couple the AC line voltage source and the variable-voltage variable-frequency drive to the multi-capacity compressor to operate the multi-capacity compressor. The processor is also configured to transmit a capacity control signal to the multi-capacity compressor, the control signal instructive to operate the multi-capacity compressor in one of a high-capacity setting, a medium-capacity setting, or a low-capacity setting, while the multi-capacity compressor is being powered by the selectively coupled one of the AC line voltage source or the variable-voltage variable-frequency drive.

In yet another aspect, a control system for a multi-capacity compressor configured to operate in at least two capacity settings is provided. The control system includes an alternating current (AC) line voltage source configured to operate the multi-capacity compressor, a variable-voltage variable-frequency drive coupled to the AC line voltage source and configured to operate the multi-capacity compressor at a variable speed, and a processor coupled to the AC line voltage source and the variable-voltage variable-frequency drive. The processor is configured to selectively couple the AC line voltage source and the variable-voltage variable-frequency drive to the multi-capacity compressor to operate the multi-capacity compressor. The processor is also configured to transmit a capacity control signal to the multi-capacity compressor, the control signal configured to select one of the at least two capacity settings at which the multi-capacity compressor is to operate while the multi-capacity compressor is being powered by the selectively coupled one of the AC line voltage source or the variable-voltage variable-frequency drive.

DETAILED DESCRIPTION

Figure 1:
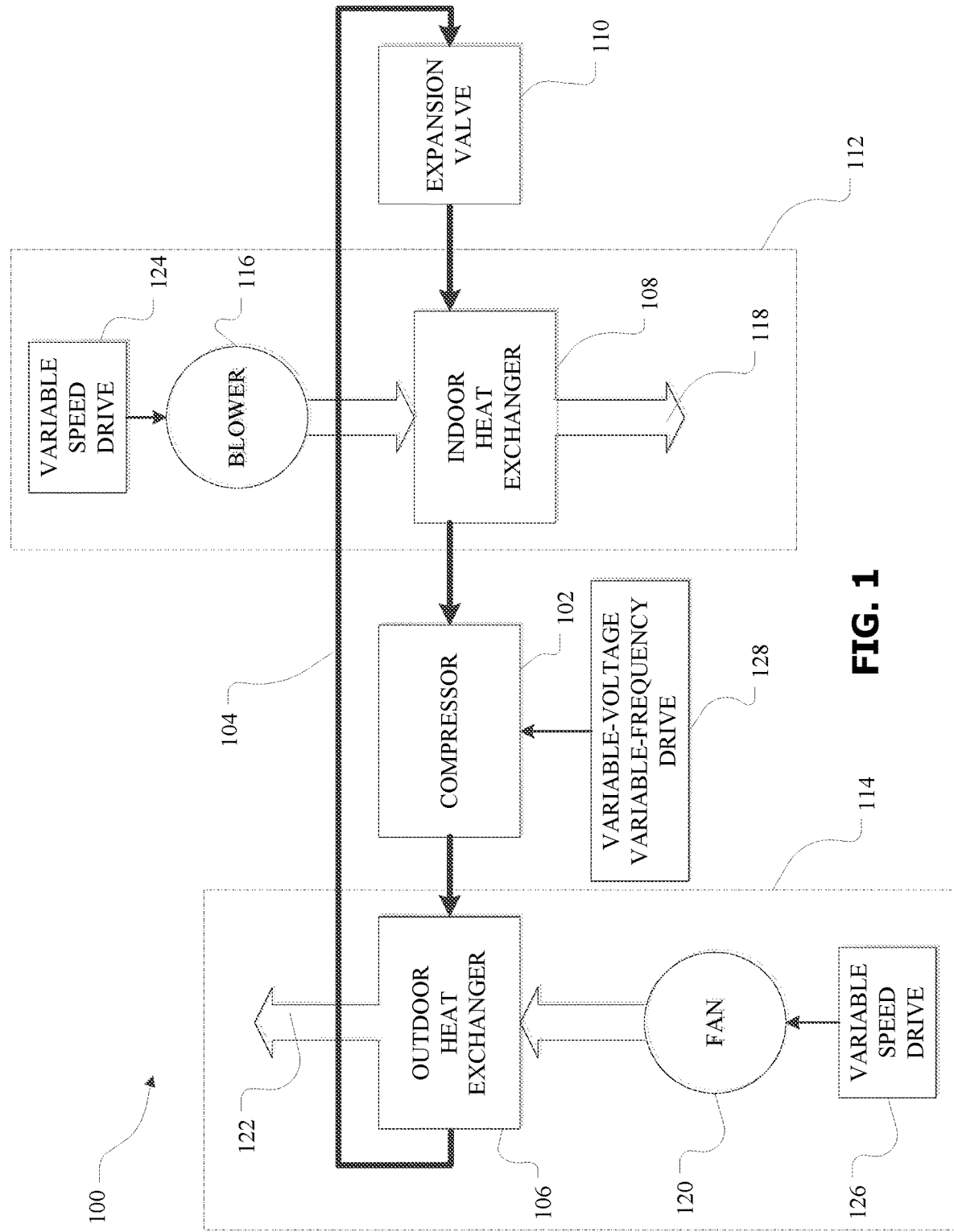
FIG. 1 is a block diagram of an exemplary HVAC system.

As used herein, an element or step recited in the singular and preceded with the word "a" or "an" should be understood as not excluding plural elements or steps, unless such exclusion is explicitly recited. Furthermore, references to "example implementation" or "one implementation" of the present disclosure are not intended to be interpreted as excluding the existence of additional implementations that also incorporate the recited features.

Single-capacity and multi-capacity, such as, for example, and without limitation, two-capacity HVAC systems generally cannot vary the speed of the compressor. Although two-capacity compressors can operate at a lower capacity, e.g., 66%, the lower capacity is typically not as low as is achieved in variable speed compressors. Consequently, such systems cannot match the cooling load during mild conditions, resulting in shortened operating periods, frequent cycling, and greater temperature variations. Variable speed HVAC systems are typically more complex due to the necessary electronics to match the drive speed to the cooling load, but do provide more efficient and more comfortable cooling over a wider range of cooling loads. Cooling loads, in certain embodiments, may be measured or estimated.

Embodiments of the present disclosure, it is realized herein, provide a combination of a multi-stage compressor (referred to herein as a "multi-capacity" compressor) and a variable speed drive that provide an even greater range of efficient operation and further improve SEER, in some cases, for example, in excess of 5 SEER. More specifically, embodiments of the HVAC systems described herein may utilize a multi-capacity compressor in combination with a variable-voltage variable-frequency drive. It is further realized herein that such an HVAC system may be operated in various configurations, including at high-capacity with the variable-voltage variable-frequency drive, at low-capacity with the variable-voltage variable-frequency drive, at high-capacity with alternating current (AC) line voltage, and at low-capacity with AC line voltage. More specifically, as realized herein, in certain embodiments, operation of the multi-capacity compressor at high-capacity with AC line voltage provides a high-capacity setting, operation at low-capacity with AC line voltage provides a medium-capacity setting, and operation at low-capacity with the variable-voltage variable-frequency drive provides a range of low-capacity settings varying in speed. It is further realized herein that, by foregoing operation at high-capacity with the variable-voltage variable-frequency drive, a lower-rated variable-voltage variable-frequency drive may be utilized. It is further realized herein that bypassing the variable-voltage variable-frequency drive for the high-capacity setting and the medium-capacity setting further improves efficiency by eliminating operating losses of the variable-voltage variable-frequency drive.

In some embodiments, the HVAC system may be operated in various other configurations, including at a medium-capacity with the variable-voltage variable-frequency drive and at medium-capacity with AC line voltage, wherein the medium-capacity represents a capacity level between the high-capacity and low-capacity. It is further realized that one or more capacity levels of the compressor may be associated with a heating operation of the HVAC system. In one particular embodiment, the high-capacity levels is associated with a heating operation of the HVAC system—that is, when the compressor operates under the high-capacity setting, the HVAC system is operating as a heat pump to heat an interior space.

As used herein, a "capacity" of the multi-capacity compressor refers to a cooling (or heating) capacity, and is variable (e.g., between high-capacity, medium-capacity, and low-capacity) by varying an internal volume of the multi-capacity compressor. For example, an actuator may be operated to vary the volume from a full internal volume, at which the multi-capacity compressor is operated at high-capacity, to a reduced internal volume, at which the multi-capacity compressor is operated at low-capacity or medium-capacity. Additional actuators and/or variably operable actuators may provide additional variability of the internal volume to provide additional capacity levels at which the multi-capacity compressor may operate. Where "cooling capacity" and/or "cooling load" are referred to herein, it should be understood that such descriptions may be equally applicable to the "heating capacity" and/or "heating load" of the HVAC system.

FIG. 1 is a block diagram of an exemplary HVAC system 100. HVAC system 100 includes a compressor 102 that compresses a refrigerant 104 to produce a pressure within HVAC system 100 and a resulting flow of refrigerant 104. Compressor 102 is a two-capacity compressor having two distinct levels of capacity at which compressor 102 may operate. In alternative embodiments, compressor 102 may have 3 or more levels of capacity. The levels of capacity are referred to as a high-capacity setting and a low-capacity setting, which further refer to the cooling capacity available at the respective levels of capacity. Generally, compressor 102 consumes more energy, i.e., electrical power, and is less efficient when operating at the high-capacity setting versus the low-capacity setting. A typical installation of HVAC system 100 operates compressor 102 at the low-capacity setting about 80% of its operating time.

As described above, in other embodiments, compressor 102 is a three-capacity compressor having three distinct levels of capacity at which compressor 102 may operate. The levels of capacity are referred to as a high-capacity setting, a medium-capacity setting, and a low-capacity setting, which further refer to the cooling or heating capacity available at the respective levels of capacity (e.g., based on the internal volume of compressor 102 at the respective levels of capacity).

HVAC system 100 includes an outdoor heat exchanger 106, an indoor heat exchanger 108, and an expansion valve 110. Compressor 102 generates the flow of refrigerant 104 through each of outdoor heat exchanger 106, indoor heat exchanger 108, and expansion valve 110 to cool an interior space 112. Heat from interior space 112 is carried by refrigerant 104 and transferred to an exterior space 114. Interior space 112 and exterior space 114 combine to define a cooling load for HVAC system 100 as a function of a temperature set point for interior space 112 and an ambient temperature of exterior space 114. When operating as a heat pump, HVAC system 100 operates in reverse, carrying heat from exterior space 114 into interior space 112. Accordingly, where reference is made herein to cooling interior space 112, it should be understood that HVAC system 100 is also configured to heat interior space 112, and such descriptions should be considered non-limiting.

During operation, as cool low-pressure refrigerant 104 moves through indoor heat exchanger 108, a blower 116 generates an interior airflow 118 through indoor heat exchanger 108. Interior airflow 118 carries warm air from interior space 112 through indoor heat exchanger 108, thereby cooling interior airflow 118 and heating refrigerant 104. Low-pressure refrigerant 104 flows from indoor heat exchanger 108 into compressor 102 and is compressed, raising the temperature and pressure of refrigerant 104 before it flows into outdoor heat exchanger 106. HVAC system 100 includes a fan 120 that generates an exterior airflow 122 through outdoor heat exchanger 106. As hot high-pressure refrigerant 104 moves through outdoor heat exchanger 106, exterior airflow 122 carriers ambient air from exterior space 114 through outdoor heat exchanger 106, thereby cooling refrigerant 104 and heating exterior airflow 122. High-pressure refrigerant 104 flows from outdoor heat exchanger 106 into expansion valve 110, where refrigerant 104 is decompressed and cooled before flowing back into indoor heat exchanger 108.

HVAC system 100 also includes a variable speed drive 124 coupled to blower 116 and configured to turn blower 116 at a variable speed. The speed at which blower 116 turns determines the volume of air in interior airflow 118 that moves through indoor heat exchanger 108. Moreover, the efficiency with which energy is transferred from the warm interior airflow 118 to the cool low-pressure refrigerant 104 flowing through indoor heat exchanger 108 is a function of the volume of air and the speed at which blower 116 turns. Further, the speed of blower 116 that is necessary to achieve efficient energy transfer may be reduced as the cooling load decreases. The speed of blower 116 may be further decreases when compressor 102 is operated at low-capacity.

HVAC system 100 includes a variable speed drive 126 coupled to fan 120 and configured to turn fan 120 at a variable speed. The speed at which fan 120 turns determines the volume of air in exterior airflow 122 that moves through outdoor heat exchanger 108. Moreover, the efficiency with which energy is transferred from the warm high-pressure refrigerant 104 flowing through outdoor heat exchanger 106 to exterior airflow 122 is a function of the volume of air and the speed at which fan 120 turns. Further, the speed of fan 120 that is necessary to achieve efficient energy transfer may be reduced as the cooling load decreases. The speed of fan 120 may be further decreased when compressor 102 is operated at low-capacity.

HVAC system 100 includes a variable-voltage variable-frequency drive 128 coupled to compressor 102. Variable-voltage variable-frequency drive 128 provides power to compressor 102 and regulates an output voltage and frequency to control the speed at which compressor 102 operates, thereby affecting the overall cooling capacity of compressor 102. At lower speeds, compressor 102 operates at a lower cooling capacity. At higher speeds, compressor 102 operates at a higher cooling capacity. Compressor 102 may be combined with variable-voltage variable-frequency drive 128 in various manners, including operating at a variable speed at the high-capacity setting, and operating at a variable speed at the low-capacity setting. Further, compressor 102 may be operated at AC line voltage to achieve respective maximum cooling capacities at the high-capacity setting and the low-capacity setting. More specifically, when operating compressor 102 at AC line voltage, variable-voltage variable-frequency drive 128 is bypassed, thereby eliminating the operating losses introduced by variable-voltage variable-frequency drive 128.

Compressor 102 may also be operated at a variable speed at a medium-capacity setting with either variable-voltage variable-frequency drive 128 or AC line voltage, thereby increasing the range of operation of HVAC system 100.

Figure 2:
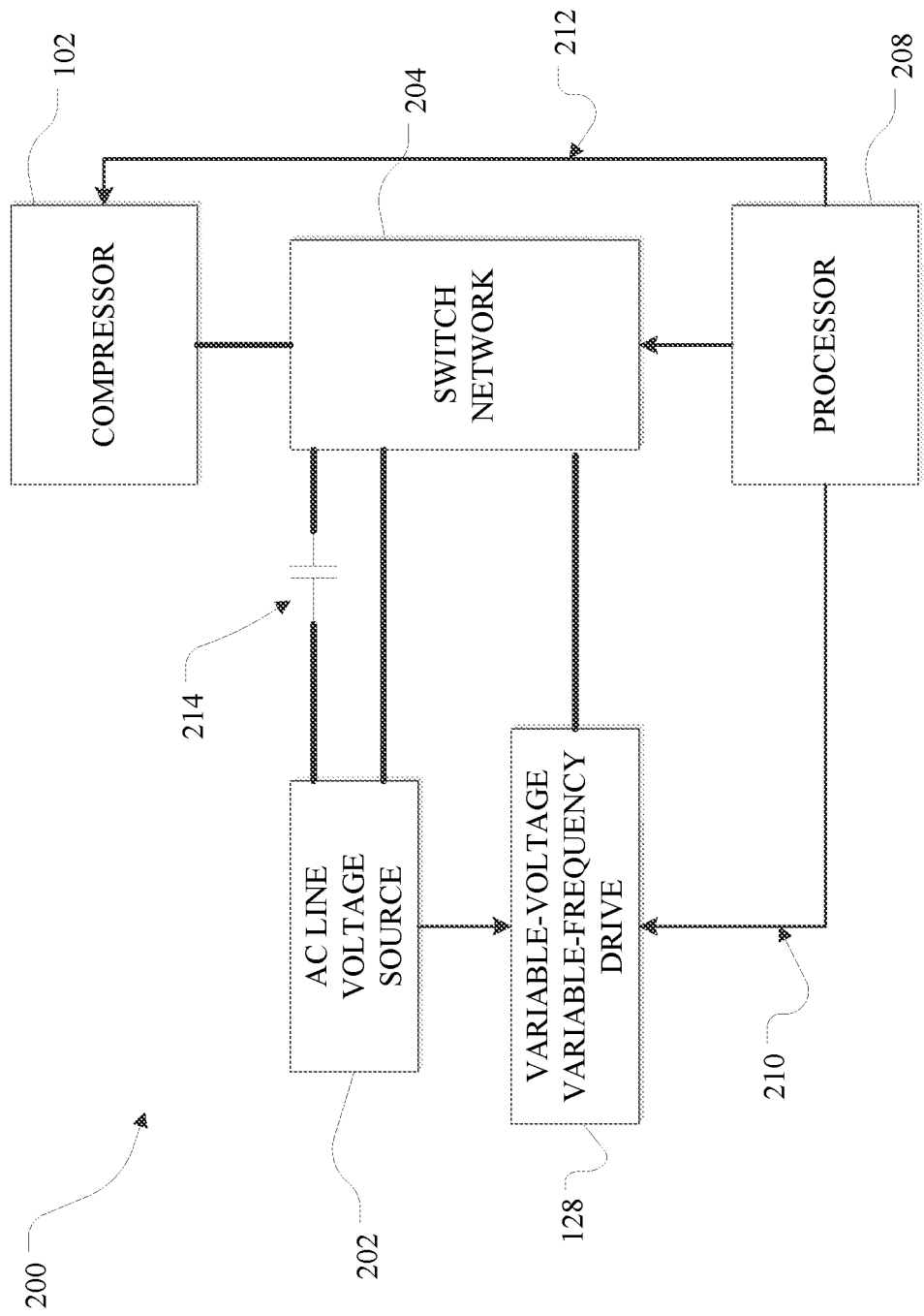
FIG. 2 is a schematic diagram of one embodiment of a control system for use in the HVAC system shown in FIG. 1.

FIG. 2 is a block diagram of an exemplary control system 200 for use with HVAC system 100 shown in FIG. 1 and, more specifically, compressor 102. Control system 200 includes an AC line voltage source 202 and variable-voltage variable-frequency drive 128 that are alternatively coupled to compressor 102 through a switching network 204 to operate compressor 102. For example, AC line voltage source 202 is coupled to compressor 102 through a run capacitor 214 and directly by closing corresponding switches within switching network 204 and decoupling variable-voltage variable-frequency drive 128. Similarly, AC line voltage source 202 is decoupled from compressor 102 by opening corresponding switches within switching network 204, coupling variable-voltage variable-frequency drive 128 to compressor 102, and bypassing run capacitor 214. In alternative embodiments, AC line voltage source 202 and variable-voltage variable-frequency drive 128 may be alternatively coupled and decoupled from compressor 102 using any suitable switching device or network of switching devices, including, for example, and without limitation, electromechanical relays, field effect transistor (FET) devices, insulated-gate bipolar transistors (IGBTs), and other power electronics. AC line voltage source 202 provides an AC line voltage signal, such as, for example 60 Hertz 240 Volt. In alternative embodiments, AC line voltage source 202 may provide other frequencies and voltages according to the grid requirements for that particular implementation. For example, certain countries utilize 50 Hertz as a line frequency. Similarly, certain countries utilize 230 Volt as a line voltage. AC line voltage source 202 may include a terminal block or bus configured to provide line voltage. In certain embodiments, AC line voltage source 202 may include a main system relay configured to switch AC line voltage to compressor 102, HVAC system 100, or both, for example.

Control system 200 includes a processor 208. Processor 208 is coupled to switching network 204. Processor 208 controls switching network 204 to alternatively couple AC line voltage source 202 and variable-voltage variable-frequency drive 128 to compressor 102. Processor 208 is further coupled to variable-voltage variable-frequency drive 128 to control the speed at which compressor 102 is operated when operated by variable-voltage variable-frequency drive 128. Processor 208 transmits a speed control signal 210 to variable-voltage variable-frequency drive 128 to affect the speed at which compressor 102 is operated. Speed control signal 210 received by variable-voltage variable-frequency drive 128 is instructive to operate compressor 102 at a variable speed. Processor 208 is further coupled to compressor 102. Processor 208 transmits a capacity control signal 212 to compressor 102. Capacity control signal 212, when received by compressor 102, is instructive to operate compressor 102 at either a high-capacity setting or a low-capacity setting. In certain embodiments, processor 208 is integrated with variable-voltage variable-frequency drive 128.

In some embodiments, processor 208 transmits capacity control signal 212 to instruct compressor 102 to operate in one of the high-capacity setting, a medium-capacity setting, and the low-capacity setting. That is, compressor 102 operates in only one of the capacity settings at any one time. Accordingly, in various embodiments, processor 208 transmits capacity controls signal 212 over one or more analog signal lines, or over a digital signal line.

In certain embodiments, processor 208 is configured to couple AC line voltage source 202 to compressor 102 and bypass variable-voltage variable-frequency drive 128, thereby eliminating the operating losses introduced by variable-voltage variable-frequency drive 128.

Figure 3:
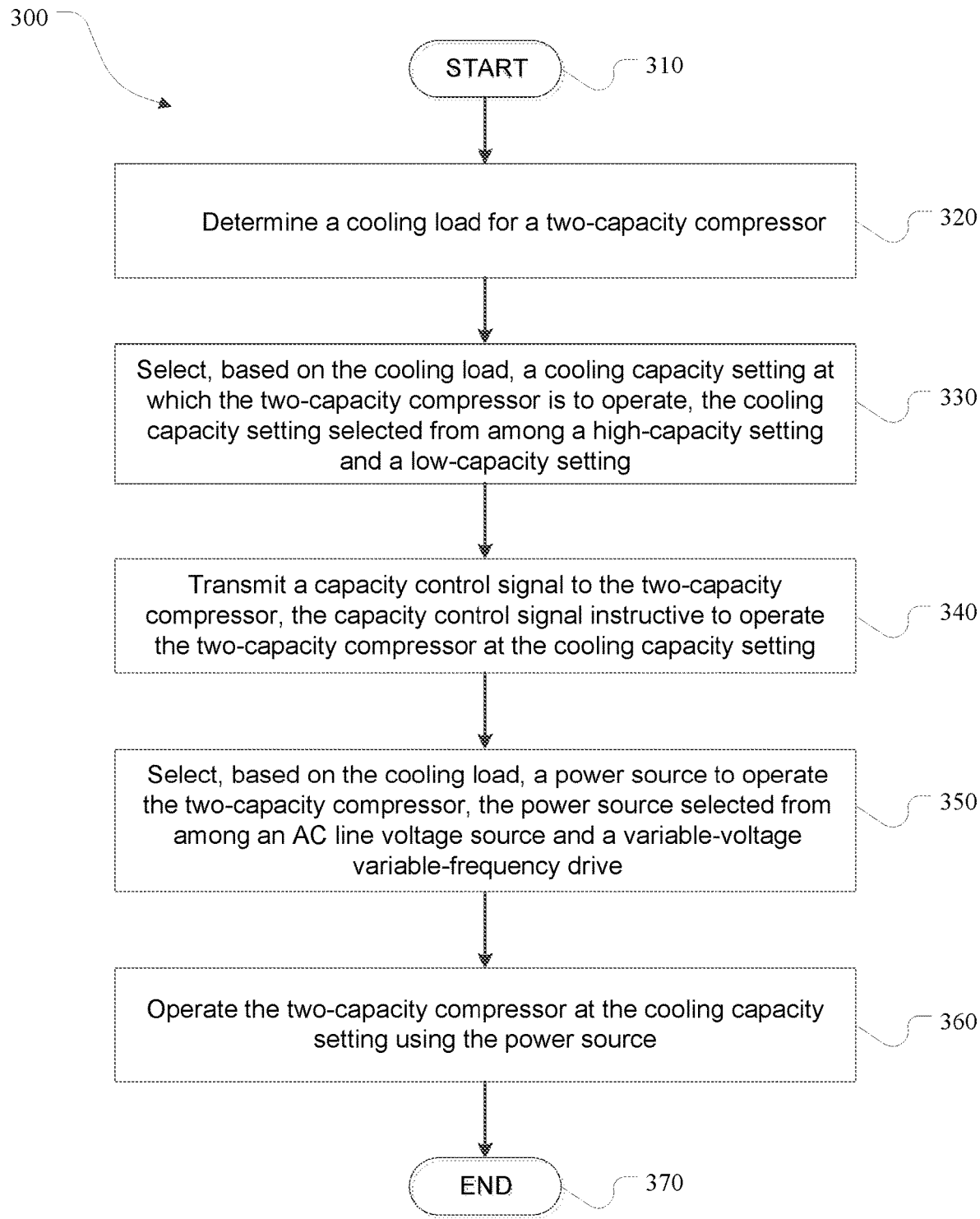
FIG. 3 is a flow diagram of an exemplary method of operating a multi-capacity compressor, such as the multi-capacity compressor shown in FIG. 1.

FIG. 3 is a flow diagram of an exemplary method 300 of operating compressor 102, shown in FIGS. 1 and 2. Method 300 begins at a start step 310. Processor 208 determines a cooling load for compressor 102 at a determination step 320. The cooling load is determined as a function of a temperature set point for interior space 112 and an ambient temperature for exterior space 114.

At a capacity selection step 330, processor 208 selects a cooling capacity setting based on the determined cooling load. The cooling capacity setting is selected from among the high-capacity setting and the low-capacity setting for compressor 102. Generally, processor 208 selects the high-capacity setting when the cooling load is large, and selects the low-capacity setting when the cooling load is smaller.

Processor 208 transmits a capacity control signal 212 to compressor 102 at a capacity control step 340. Capacity control signal 212 is instructive to operate compressor 102 at the selected cooling capacity setting, i.e., the high-capacity setting or the low-capacity setting.

At a power source selection step 350, processor 208 selects a power source to operate compressor 102 based on the determined cooling load. The power source is selected by processor 208 from among AC line voltage source 202 and variable-voltage variable-frequency drive 128. Given the capacity selection at capacity selection step 330 and the determined cooling load, processor 208 selects either AC line voltage source 202 or variable-voltage variable-frequency drive 128 to match the cooling output of compressor 102 during operation 360 of compressor 102 with the determined cooling load. For example, when the cooling load is at its maximum, processor 208 selects 330 the high-capacity setting for compressor 102 and operates 360 compressor 102 with AC line voltage source 202 as the power source to produce the maximum cooling output. Likewise, when the cooling load is minimal, processor 208 selects 330 the low-capacity setting and operates 360 compressor 102 using variable-voltage variable-frequency drive 128 to achieve a low speed and low cooling output, thereby improving the efficiency of compressor 102. Further, when the cooling load is at an intermediate level, in certain embodiments, processor 208 selects 330 the low-capacity setting and further selects 350 AC line voltage source 202 to operate 360 compressor 102 at the maximum cooling capacity for the low-capacity setting. Moreover, in such embodiments, variable-voltage variable-frequency drive 128 is bypassed to eliminate the operating losses introduced by variable-voltage variable-frequency drive 128 when operated at a variable speed.

In certain embodiments, compressor 102 is only operable with variable-voltage variable-frequency drive 128 when compressor 102 is operated at the low-capacity setting. Consequently, when processor 208 selects 330 the high-capacity setting, processor 208 further selects 350 AC line voltage source 202 to operate 360 compressor 102. Method 300 terminates at an end step 370.

Figure 4:
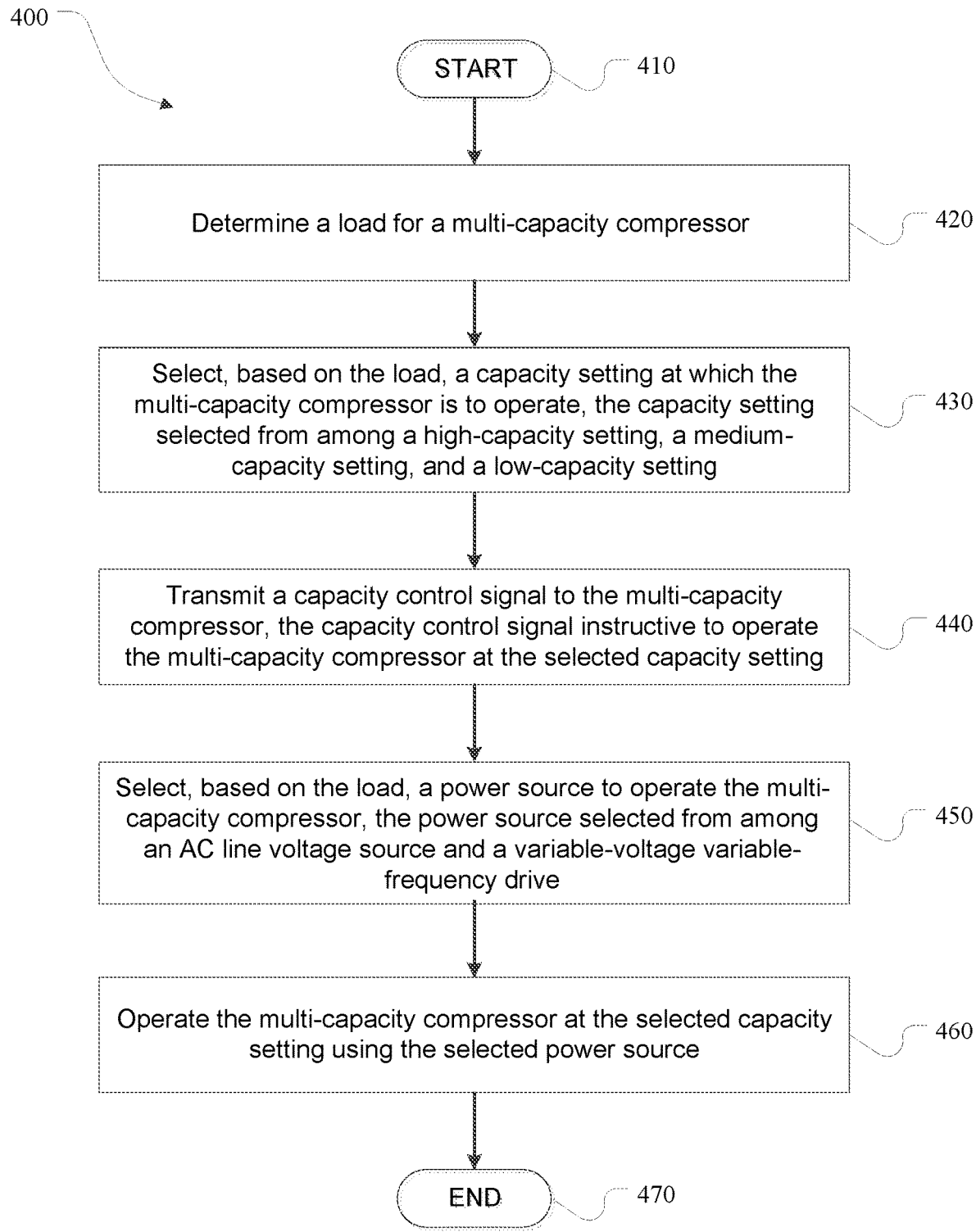
FIG. 4 is a flow diagram of another exemplary method of operating a multi-capacity compressor, such as the multi-capacity compressor shown in FIG. 1.

FIG. 4 is a flow diagram of an exemplary method 400 of operating compressor 102, shown in FIGS. 1 and 2. Method 400 begins at a start step 410. Processor 208 determines one of a cooling load or a heating load (generally, a load) for compressor 102 at a determination step 420. The cooling load or heating load for compressor 102 is determined as a function of a temperature set point for interior space 112 and an ambient temperature for exterior space 114.

At a capacity selection step 430, processor 208 selects a capacity setting based on the determined cooling or heating load. The capacity setting may be a cooling capacity setting or a heating capacity setting. The capacity setting is selected from among the high-capacity setting, the medium-capacity setting, and the low-capacity setting for compressor 102 such that a compressor output (e.g., a heating or cooling output from compressor 102) is matched to the determined load. Generally, processor 208 selects the high-capacity setting when the cooling load is large, and selects the medium-capacity or low-capacity setting when the cooling load is smaller. For example, processor 208 selects the high-capacity setting when the cooling load is above a first threshold, selects the medium-capacity setting when the cooling load is below the first threshold and above a second (lower) threshold, and selects the low capacity setting when the cooling load is below the second threshold. In some embodiments, when processor 208 determined a heating load for compressor 102, of any magnitude, processor 208 selects the high-capacity setting. That is, in such embodiments, the high-capacity setting is reserved for heating operations of HVAC system 100.

Processor 208 transmits a capacity control signal 212 to compressor 102 at a capacity control step 440. Capacity control signal 212 is instructive to operate compressor 102 at the selected capacity setting, i.e., the high-capacity setting, the medium-capacity setting, or the low-capacity setting.

At a power source selection step 450, processor 208 selects a power source to operate compressor 102 based on the determined cooling or heating load. The power source is selected by processor 208 from among AC line voltage source 202 and variable-voltage variable-frequency drive 128. Given the capacity selection at capacity selection step 430 and the determined cooling or heating load, processor 208 selects either AC line voltage source 202 or variable-voltage variable-frequency drive 128 to match a necessary output of compressor 102 during operation 460 of compressor 102 with the determined cooling or heating load. For example, when a cooling load is at its maximum, processor 208 selects 430 the high-capacity setting for compressor 102 and operates 460 compressor 102 with AC line voltage source 202 as the power source to produce the maximum cooling output. Likewise, when the cooling load is minimal, processor 208 selects 430 the low-capacity setting and operates 460 compressor 102 using variable-voltage variable-frequency drive 128 to achieve a low speed and low cooling output, thereby improving the efficiency of compressor 102. Further, when the cooling load is at an intermediate level, in certain embodiments, processor 208 selects 430 the medium-capacity setting or the low-capacity setting and further selects 450 AC line voltage source 202 to operate 460 compressor 102. Moreover, in such embodiments, variable-voltage variable-frequency drive 128 is bypassed to eliminate the operating losses introduced by variable-voltage variable-frequency drive 128 when operated at a variable speed. Method 400 terminates at an end step 470.

HVAC systems described herein provide a combination of a multi-capacity compressor and a variable speed drive that provide an even greater range of efficient operation and further improve SEER, in some cases, for example, in excess of 5 SEER. More specifically, embodiments of the HVAC systems described herein may utilize a multi-capacity compressor in combination with a variable-voltage variable-frequency drive. It is further realized herein that such an HVAC system may be operated in various configurations, including at high-capacity with the variable-voltage variable frequency drive, at low-capacity with the variable-voltage variable-frequency drive, at high-capacity with alternating current (AC) line voltage, and at low-capacity with AC line voltage. More specifically, as realized herein, in certain embodiments, operation of the multi-capacity compressor at high-capacity with AC line voltage provides a high-capacity setting, operation at low-capacity with AC line voltage provides a medium-capacity setting, and operation at low-capacity with the variable-voltage variable-frequency drive provides a range of low-capacity settings varying in speed. It is further realized herein that, by foregoing operation at high-capacity with the variable-voltage variable-frequency drive, a lower-rated variable-voltage variable-frequency drive may be utilized. It is further realized herein that bypassing the variable-voltage variable-frequency drive for the high-capacity setting and the medium-capacity setting further improves efficiency by eliminating forward operating losses of the variable-voltage variable-frequency drive.

It is further realized that such an HVAC system may be operated at medium-capacity with the variable-voltage variable frequency drive, and at medium-capacity with the AC line voltage. In certain embodiments, operation of the multi-capacity compressor at high-capacity is reserved for heating outputs based on heating loads, whereas operation of the multi-capacity compressor under lower-capacity settings (e.g., low-capacity or medium-capacity) is reserved for cooling outputs matched to measured cooling loads.

The methods and systems described herein may be implemented using computer programming or engineering techniques including computer software, firmware, hardware or any combination or subset thereof, wherein the technical effect may include at least one of: (a) combining a multi-capacity compressor with a variable speed drive, e.g., a variable-voltage variable-frequency drive; (b) reducing losses by bypassing the variable-voltage variable-frequency drive when operating at a line voltage, particularly at intermediate operating speeds; (c) operating the multi-capacity compressor at a low-capacity and at a variable speed; (d) operating a two-capacity compressor at less than 40% of full cooling capacity; (e) improving operating efficiency, e.g., SEER, of the multi-capacity compressor and the HVAC system; (f) reducing the necessary fan speeds for heat transfer from heat exchangers during low cooling loads; (g) improving efficiency of the HVAC system further by lowering fan speeds to operate in a more efficient range of speeds; (h) operating the multi-capacity compressor at a low-capacity for longer cycles; (i) improving efficiency and comfort due to more continuous low-capacity cooling; (j) improving compressor lubrication through use at higher rotational speed and lower capacity; (k) reducing cost and complexity over variable speed compressors; (l) operating the multi-capacity compressor at three or more capacity levels, including a high-capacity, medium-capacity, and low-capacity; and (m) operating the multi-capacity compressor at a high-capacity setting under a heating load.

Some embodiments involve the use of one or more electronic or computing devices. Such devices typically include a processor, processing device, or controller, such as a general purpose central processing unit (CPU), a graphics processing unit (GPU), a microcontroller, a reduced instruction set computer (RISC) processor, an application specific integrated circuit (ASIC), a programmable logic circuit (PLC), a field programmable gate array (FPGA), a digital signal processing (DSP) device, and/or any other circuit or processing device capable of executing the functions described herein. The methods described herein may be encoded as executable instructions embodied in a computer readable medium, including, without limitation, a storage device and/or a memory device. Such instructions, when executed by a processing device, cause the processing device to perform at least a portion of the methods described herein. The above examples are exemplary only, and thus are not intended to limit in any way the definition and/or meaning of the terms processor, processing device, and controller.

In the embodiments described herein, memory may include, but is not limited to, a computer-readable medium, such as a random access memory (RAM), and a computer-readable non-volatile medium, such as flash memory. Alternatively, a floppy disk, a compact disc-read only memory (CD-ROM), a magneto-optical disk (MOD), and/or a digital versatile disc (DVD) may also be used. Also, in the embodiments described herein, additional input channels may be, but are not limited to, computer peripherals associated with an operator interface such as a mouse and a keyboard. Alternatively, other computer peripherals may also be used that may include, for example, but not be limited to, a scanner. Furthermore, in the exemplary embodiment, additional output channels may include, but not be limited to, an operator interface monitor.

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are examples only, and are thus not limiting as to the types of memory usable for storage of a computer program.

The systems and methods described herein are not limited to the specific embodiments described herein, but rather, components of the systems and/or steps of the methods may be utilized independently and separately from other components and/or steps described herein.

This written description uses examples to provide details on the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A heating ventilation and air conditioning (HVAC) system, comprising:
    a multi-capacity compressor configured to operate selectively at a high-capacity setting, a medium-capacity setting, and a low-capacity setting to provide a compressor output;
    a variable-voltage variable-frequency drive coupled to said multi-capacity compressor and configured to power said multi-capacity compressor to operate at a variable speed; and
    a processor coupled to said multi-capacity compressor and said variable-voltage variable-frequency drive, said processor configured to:
    determine a load for said multi-capacity compressor;
    select the high-capacity setting, the medium-capacity setting, or the low-capacity setting at which said multi-capacity compressor should operate based on the determined load, and
    based on the selection, during operation of said multi-capacity compressor:
        employ said variable-voltage variable-frequency drive to power said multi-capacity compressor to operate at the variable speed to match the compressor output to the load when operating said multi-capacity compressor at the medium-capacity setting or the low-capacity setting; and
        bypass said variable-voltage variable-frequency drive when operating said multi-capacity compressor at the high-capacity setting for a compressor heating output based on the load including all heating loads.

2. The HVAC system of claim 1, wherein said processor is further configured to, when the high-capacity setting is selected, couple said multi-capacity compressor to an alternating current (AC) line voltage source.

3. The HVAC system of claim 1, wherein said processor is further configured to:
determine the variable speed based on the load including a cooling load; and
transmit a speed control signal to said variable-voltage variable-frequency drive to power said multi-capacity compressor to operate at the variable speed.

4. The HVAC system of claim 1, wherein said processor is further configured to bypass said variable-voltage variable-frequency drive when operating said multi-capacity compressor at each of the medium-capacity setting or the low-capacity setting based on the load including a cooling load.

5. A control system for a multi-capacity compressor, said control system comprising:
an alternating current (AC) line voltage source configured to power the multi-capacity compressor;
a variable-voltage variable-frequency drive coupled to said AC line voltage source and configured to power the multi-capacity compressor to operate at a variable speed; and
a processor coupled to said AC line voltage source and said variable-voltage variable-frequency drive, said processor configured to:
during operation of the multi-capacity compressor, selectively couple said AC line voltage source and said variable-voltage variable-frequency drive to the multi-capacity compressor to power the multi-capacity compressor, based on a load determined for the multi-capacity compressor, and
transmit a capacity control signal to the multi-capacity compressor, the control signal instructive to operate the multi-capacity compressor in one of a high-capacity setting, a medium-capacity setting, or a low-capacity setting, while the multi-capacity compressor is being powered by the selectively coupled one of said AC line voltage source or said variable-voltage variable-frequency drive.

6. The control system of claim 5, wherein said processor is further configured to:
determine one of a cooling load or a heating load for the multi-capacity compressor;
select, based on the one of the cooling load or the heating load, a capacity setting at which the multi-capacity compressor is to operate, the capacity setting selected from among the high-capacity setting, the medium-capacity setting, and the low-capacity setting.

7. The control system of claim 6, wherein said processor is further configured to select the high-capacity setting when any heating load for the multi-capacity compressor is determined.

8. The control system of claim 6, wherein said processor is further configured to:
select the high-capacity setting when the cooling load is above a first threshold;
select the medium-capacity setting when the cooling load is below the first threshold and above a second threshold; and
select the low-capacity setting when the cooling load is below the second threshold.

9. The control system of claim 5, wherein said processor is further configured to transmit a speed control signal to said variable-voltage variable-frequency drive to set the variable speed at which the multi-capacity compressor operates.

10. The control system of claim 9, wherein said processor is further configured to select the variable speed at which the multi-capacity compressor operates according to a measured cooling load that is based on a function of a temperature set point for an interior space and a measured ambient temperature of an exterior space.

11. The control system of claim 5, wherein said processor is further configured to:
estimate one of a cooling load or a heating load for the multi-capacity compressor; and
selectively couple said AC line voltage source and said variable-voltage variable-frequency drive to the multi-capacity compressor based on the one of the estimated cooling load or the estimated heating load.

12. The control system of claim 5 further comprising a bypass circuit coupled to said variable-voltage variable-frequency drive, said bypass circuit configured to supply power to the multi-capacity compressor using said AC line voltage source coupled in series with a run capacitor, and bypass said variable-voltage variable-frequency drive.

13. The control system of claim 12, wherein said processor is further configured to operate the multi-capacity compressor exclusively at the high-capacity setting when coupling said AC line voltage source to the multi-capacity compressor to power the multi-capacity compressor with said AC line voltage source and bypassing said variable-voltage variable-frequency drive.

14. The control system of claim 5, wherein said processor is further configured to operate the multi-capacity compressor exclusively at the high-capacity setting when operating according to a measured heating load that is based on a function of a temperature set point for an interior space and a measured ambient temperature of an exterior space.

15. A control system for a multi-capacity compressor configured to operate in at least two capacity settings, said control system comprising:
an alternating current (AC) line voltage source configured to operate the multi-capacity compressor;
a variable-voltage variable-frequency drive coupled to said AC line voltage source and configured to power the multi-capacity compressor to operate at a variable speed; and
a processor coupled to said AC line voltage source and said variable-voltage variable-frequency drive, said processor configured to:
during operation of the multi-capacity compressor, selectively couple said AC line voltage source and said variable-voltage variable-frequency drive to the multi-capacity compressor to operate the multi-capacity compressor, based on a load determined for the multi-capacity compressor, and
transmit a capacity control signal to the multi-capacity compressor, the control signal configured to select one of the at least two capacity settings at which the multi-capacity compressor is to operate while the multi-capacity compressor is being powered by the selectively coupled one of said AC line voltage source or said variable-voltage variable-frequency drive.

16. The control system of claim 15, wherein said processor is further configured to transmit a speed control signal to said variable-voltage variable-frequency drive to set the variable speed at which the multi-capacity compressor operates.

17. The control system of claim 16, wherein said processor is further configured to select the variable speed at which the multi-capacity compressor operates according to a measured cooling load that is based on a function of a temperature set point for an interior space and a measured ambient temperature of an exterior space.

18. The control system of claim 15, wherein said processor is further configured to alternatively couple said AC line voltage source and said variable-voltage variable-frequency drive based on one of an estimated cooling load or an estimated heating load.

19. The control system of claim 15, wherein said AC line voltage source comprises a switch network through which an AC line voltage is switched, the AC line voltage comprising a 60 Hertz 240 volt signal.

20. The control system of claim 15, wherein said AC line voltage source comprises a switch network through which an AC line voltage is switched, the AC line voltage comprising a 115 volt signal.

21. The control system of claim 15 further comprising a bypass circuit coupled to said variable-voltage variable-frequency drive, said bypass circuit configured to supply power to the multi-capacity compressor using said AC line voltage source coupled in series with a capacitor, and bypass said variable-voltage variable-frequency drive.

22. The control system of claim 15, wherein said processor is further configured to operate the multi-capacity compressor exclusively at the high-capacity setting when powering the multi-capacity compressor with said AC line voltage source.

* * * * *